Patented Nov. 14, 1944

2,362,628

UNITED STATES PATENT OFFICE 2,362,628

METHODS OF PRODUCING MOLDING POWDERS

Eustace Glycofrides, Toledo, Ohio, assignor to Owens-Illinois Glass Company, a corporation of Ohio No Drawing. Application December 12, 1940, Serial No. 369,864

9 Claims. (Cl. 106—218)

My invention relates to polymerized products adapted for use in molding compounds and methods for producing the same. More particularly it has reference to the production of a molding compound in which a thermoplastic material, such as pinewood pitch, is employed as a basic material and which by a novel method of heat treating is converted into a thermosetting type of material, similar in performance and physical properties to thermosetting resins of the phenol formaldehyde type now on the market and in general use under the trade name "Bakelite." The present invention provides a compound equalling such resins in performance, durability and speed of molding. The term "thermosetting" as herein used is applied to thermoplastics which when heated set or harden. When subjected to heat and pressure within a mold, they will flow to take the shape of the mold and then set up or harden.

An object of my invention is to provide a novel method of producing a compound or material having the desirable characteristics of Bakelite molding powders but which may be produced at a small cost as compared with that of commercial molding powers now on the market, and which will thus permit the use of molding compounds in many instances where such present day molding powders are prohibited on account of the high cost.

A further object of the invention is to provide a novel method of producing a molding powder in which extracted pinewood pitch is used as a basic ingredient comprising a large percentage of the compound, thereby greatly reducing the cost as compared with molding compounds for like purposes now on the market.

A further object of my invention is to provide a method wherein pinewood pitch is heat treated with lime or a like material used as a reagent or accelerator, either alone or in combination with another accelerating reagent such as hexamethylenetetramine (herein referred to as hexa) to produce a partial polymerization, and the resultant product thereafter combined with other ingredients to produce a thermosetting molding powder or material, which may be molded and caused to set or harden by the application of heat and pressure applied to the material within a mold.

Other objects of the invention will appear hereinafter.

The present invention embodies improvements on the method disclosed in my copending application, Serial Number 335,319, filed May 15, 1940, for Molding powders, and includes a novel method of heat treating the basic material such as pinewood pitch for producing the required polymerization, resulting in the thermosetting material. The present invention is a continuation in part of said copending application.

The present invention involves the use of a product which, when subjected to heat treatment for a certain period of time at a temperature which may range from 400 to 450° F., will polymerize or set up into such a stage that when mixed with other ingredients required to produce a molding powder, the resultant mixture will possess substantially the same characteristics as now exhibited by current commercial molding powders of the phenol formaldehyde type. More specifically, the invention embodies the use of extracted pinewood pitch which is a thermoplastic material but which, by the application of heat and pressure, can be converted into a thermosetting type of material with physical properties substantially similar to commercial materials of phenol formaldehyde origin.

Extracted pinewood pitch is the residue after the separation of rosin, turpentine and other valuable constituents of pinewood. It is extensively produced as a by-product in the manufacture of such pinewood constituents and is characterized by being insoluble in petroleum hydrocarbons and comprising a residue low in abietic acid remaining after the separation of refined resin high in abietic acid from the resinous material obtained by extraction of pinewood with a solvent. One method of producing the pitch is by using types of solvents that will extract and separate the pinewood pitch. Another method is by fractional distillation. Heretofore it has been considered of little or no value or importance and has usually been discarded. Such material is at the present time sold on the market at a very low price. It supplies an inexpensive base material which when combined with the proper type of other ingredients such as a filler, coloring agent, lubricant, accelerator, etc., can be compounded into molding powders, the cost of which is very small compared to that of present commercial molding powders.

In accordance with the present invention the pinewood pitch or like material is first brought to an advanced stage of polymerization by heat treating in an oven at a temperature of 400 to 450° F. for a certain period of time. This heat treatment changes the molecular structure to such an extent that the material is converted from a thermoplastic to a thermosetting material which, when incorporated with the rest of the ingredients required to make a molding powder, performs equally as well as current commercial compounds of the thermosetting phenolic type.

Material prepared in this manner will form molding powders similar to commercial compounds without the incorporation of phenol. The time required to change the molecular structure of the pinewood pitch and to bring it to the required stage of advanced polymerization depends largely upon the temperature employed and may range from 2 to 12 hours.

The heat treatment is continued to a point which will produce the desired cycle of curing, such that a molded piece of the material two inches in diameter and 1/16th inch thick would require from ten to fifteen seconds setting time, which is the cycle of the best commercial materials available at the present time. This point, referred to as the end point of the pinewood pitch product, is determined by molding a piece of the above specified dimensions. The molding powder will set up in ten to fifteen seconds to a temperature of 380° F. if the material has reached the correct stage. After this end point has been reached, no further heat treatment is required. When the material has reached this stage, the remaining ingredients are added, such as the required amount of filler, lubricant, coloring material and accelerator, which added ingredients amount to 55%, more or less, of the total compound. The ingredients are then mixed and condensed by heat and pressure in the mixing rolls, cooled and ground to particle size suitable for use as a molding compound.

The following is an example of a basic material prepared with pinewood pitch. The latter is heat treated in an oven at 430° F. for a period of approximately five hours. In heat treating the material it should be spread out to a thickness not to exceed one inch, thereby assuring a uniform heating throughout the mass of the material and a uniform reaction between the ingredients used. This is necessary because the pinewood pitch is a poor conductor of heat and with any material increase in the thickness of the layer, the heat treatment would not be adequate to complete the reaction. After the heat treating operation is completed, the material is ground to a fine powder. This basic material is herein referred to as material A.

The following are examples of molding powders which may be prepared from the above basic material.

|  | Grams |
|---|---|
| 1. Material A | 1,000 |
| Wood flour | 1,000 |
| Lubricant (for example, calcium stearate) | 20 |
| Coloring material (such as carbon black) | 40 |
| Hexamethylenetetramine | 50 |

The above ingredients are mixed in a pebble mill for thirty minutes and the volume is condensed in rolls for approximately one and one-half minutes, in accordance with the usual procedure in the preparation of molding powders, the fast roll being at a temperature of 310° F. and the slow roll at 210° F. The material at this stage may be tested as to its flowability and setting time, and if slow in setting, the rolling time should be extended accordingly.

|  | Grams |
|---|---|
| 2. Material A | 1,000 |
| Wood flour | 1,000 |
| Lubricant | 20 |
| Coloring material | 40 |

This differs from Example 1 by omitting the hexa. In some cases the use of the hexa improves the finish while in others its omission is preferable.

|  | Grams |
|---|---|
| 3. Material A | 1,200 |
| Wood flour | 1,000 |
| Lubricant | 20 |
| Coloring material | 40 |
| Hexamethylenetetramine | 50 |
| Lime | 50 |

This example differs from Example 1 in that there is an increased proportion of pinewood pitch. This is sometimes desirable. On account of the cheapness of the pinewood pitch resin, an increase in the resin content of the molding powder can well be afforded which also gives a finer and materially stronger molded article.

|  | Grams |
|---|---|
| 4. Material A | 1,000 |
| Wood flour | 1,000 |
| Lubricant | 20 |
| Coloring material | 40 |
| Lime | 50 |

As a modification of the basic material and the method of its production, a certain amount of lime (CaO) may be mixed with the pinewood pitch, the lime functioning as an accelerator in the heat treatment. In this instance the pinewood pitch may be brought to an advanced stage of polymerization by mixing with it from 1 to 30% of the lime, the percentage depending upon the properties desired. The ingredients may be mixed in a pebble mill for a sufficient length of time to insure a thorough blending of the ingredients (usually about 30 minutes). The mixture is then heat treated in an oven at 400 to 450° F. for a predetermined period of time. The lime, acting as an accelerator, reduces the time required to convert the molecular structure from a thermoplastic to a thermosetting material. This material when incorporated with the other ingredients necessary to make a molding powder performs equally as well as current commercial compounds of the phenol setting type. The time required to change the molecular structure and to bring it to the desired stage of advanced polymerization, depends largely upon the temperature and the amount of lime used. As the amount of lime is increased, the time is decreased, and vice versa. The time of setting up the pinewood pitch to the desired degree of polymerization would be from 10 minutes to two hours at the lower temperature of about 400° F., or from ten minutes to one hour at a temperature of 450° F., depending upon the amount of lime used.

The end point of the pinewood pitch product, giving the desired cycle of curing, may be determined in the same manner as heretofore described, namely, by molding a piece two inches in diameter and about one-sixteenth inch thick for testing the cycle of curing. When the material has reached this stage, the rest of the ingredients are added, including lubricant, coloring material, filler and accelerator, which may amount to 55% of the total compound.

*Compound B.*—The following is an example of a basic compound prepared with pinewood pitch and lime used as an accelerator. The pinewood pitch is mixed with 5% lime in the pebble mill for 30 minutes. The mixture is heated in the oven at 425° F. for a period of approximately two hours and ten minutes. After the heat treating operation is completed, the material is ground to a fine powder, herein referred to as compound B. As examples of molding powders made with the use of basic molding compound B, such compound B may be substituted for the material A in the examples above given, the other ingredients remaining the same.

A further modification of the present invention comprises the use of the hexa, either alone or in additon to and in combination with lime, as an accelerating agent in the heat treatment of the basic material such as extracted pinewood pitch. In accordance with this modification, hexa and lime may be combined with the pinewood pitch and heat treated at a temperature of from 400 to 450° F. to bring the material to an advanced stage of polymerization. For example, a compound comprising from 1 to 10% of hexa and 90 to 99% pinewood pitch, is mixed in a pebble mill to insure a thorough blending of the ingredients. The mixture is then heat treated in an oven at 400° F. for a period of about 30 minutes. The resulting material is then cooled and ground and from 1 to 30% of lime is added, the amount of lime depending upon the properties desired. These ingredients are then mixed in a pebble mill for a sufficient period of time to insure thorough blending (about 30 minutes), and thereafter heat treated at a temperature of from 400 to 450° F. for a certain period of time, from 10 minutes to 1 hour. The hexa and lime, together with the heat treatment, change the molecular structure to such an extent that the material is converted from a thermoplastic to a thermosetting type which, when incorporated with the other ingredients required to make a molding powder, performs equally as well as current commercial compounds of the thermosetting phenolic type.

The time required to change the molecular structure and bring it to the desired stage of advanced polymerization depends largely upon the temperature and the amount of lime and hexa used. As the amount of the accelerators is increased, the time is decreased and vice versa. At from 400 to 450° F., the time of setting up would be approximately 1 to 1½ hours. The end point is determined in the manner heretofore described in connection with preceding methods.

*Basic compound C.*—The following example of a basic compound designated "C" is prepared as follows:

Pinewood pitch is mixed with 5% hexa in a pebble mill for 30 minutes. The resultant product is treated in an oven at 400° F. for 10 minutes to 1 hour. The material is then ground and 5% of lime added, mixed in the pebble mill, and again heat treated as described above. This compound C comprises:

| | Grams |
|---|---|
| Pinewood pitch | 1,000 |
| Hexamethylenetetramine | 50 |
| Lime | 50 |

Examples of molding powder embodying this compound C may be made by substituting said compound for the material A in preceding examples.

The present invention further comprises the use of paraformaldehyde as an accelerating agent. The amount used for this purpose should be within the range of from 1 to 10% of the amount of pinewood pitch. The paraformaldehyde can be used as a substitute for either the lime or the hexa in carrying out the processes or methods above described, the various steps in the method, including the heat treatment at the specified temperatures, being the same as above set forth.

Modifications may be resorted to within the spirit and scope of my invention.

I claim:

1. The method of producing a thermosetting material consisting mainly of an extracted pinewood pitch characterized by being substantially insoluble in petroleum hydrocarbons and comprising a residue low in abietic acid remaining after the separation of refined resin high in abietic acid from the resinous material obtained by extraction of pinewood with a solvent, which method comprises heat treating the said pitch at a temperature of about 430° F. for a period of about five hours and thereby causing polymerization and producing said thermosetting material.

2. The method of producing a thermosetting compound, the major ingredient of which is pinewood pitch, the pinewood pitch being characterized by being insoluble in petroleum hydrocarbons and comprising a residue low in abietic acid remaining after the separation of refined resin high in abietic acid from the resinous material obtained by extraction of pinewood with a solvent, which method comprises adding to the pinewood pitch from 1 to 30% of lime, mixing the pitch and lime, thereafter heat treating the mixture at a temperature of from 400 to 450° F. for a period of about 1 to 6 hours and thereby causing polymerization of the mixture by which it is converted into a heat-setting material.

3. The method of producing a compound comprising pinewood pitch and lime, said pitch being characterized by being insoluble in petroleum hydrocarbons and comprising a residue low in abietic acid remaining after the separation of refined resin high in abietic acid from the resinous material obtained by extraction of pinewood with a solvent, which method comprises mixing the pitch with about 5% of lime, heat treating the mixture at a temperature of about 425° F. for a period of about two hours and ten minutes, and thereby polymerizing the mixture and producing a thermosetting material suitable for use as an ingredient of a molding powder of the thermosetting type.

4. The method of producing a compound comprising pinewood pitch and lime, said pitch being characterized by being insoluble in petroleum hydrocarbons and comprising a residue low in abietic acid remaining after the separation of refined resin high in abietic acid from the resinous material obtained by extraction of pinewood with a solvent, which method comprises mixing the pitch with about 5% of lime, heat treating the mixture at a temperature of about 425° F. for a period of about two hours and ten minutes, and thereby polymerizing the mixture and producing a thermosetting material, pulverizing said material, mixing therewith an approximately equal amount of wood flour, condensing the resultant mixture under heat and pressure, and cooling the condensed mixture.

5. The method of producing a compound consisting of a mixture of extracted pinewood pitch, lime and hexamethylenetetramine, said ptich being characterized by being insoluble in petroleum hydrocarbons and comprising a residue low in abietic acid remaining after the separation of refined resin high in abietic acid from the resinous material obtained by extraction of pinewood with a solvent, which method comprises heat treating the mixture at a temperature of about 400 to 450° F. a sufficient length of time to cause partial polymerization and produce a thermosetting compound.

6. The method which comprises compounding a mixture of pinewood pitch, hexamethylenetetramine and lime, the pinewood pitch being characterized by being insoluble in petroleum hydrocarbons and comprising a residue low in abietic acid remaining after the separation of refined resin high in abietic acid from the resinous material obtained by extraction of pinewood with a solvent, the hexamethylenetetramine being from 1 to 10% of the amount of pitch and the lime being from 1 to 30% of the amount of pitch, and heat treating the mixture at a temperature of from 400 to 450° F.

7. The method which comprises compounding a mixture consisting of 90 to 99% pinewood pitch and 1 to 10% hexamethylenetetramine, the pinewood pitch being characterized by being insoluble in petroleum hydrocarbons and comprising a residue low in abietic acid remaining after the separation of refined resin high in abietic acid from the resinous material obtained by extraction of pinewood with a solvent, heat treating the mixture for about 30 minutes at a temperature of about 400° F., pulverizing the resultant product, adding thereto from 1 to 30% lime, mixing said materials, and heat treating the mixture at a temperature of about 400 to 450° F.

8. The method which comprises compounding a mixture consisting of 90 to 99% pinewood pitch and 1 to 10% hexamethylenetetramine, the pinewood pitch being characterized by being insoluble in petroleum hydrocarbons and comprising a residue low in abietic acid remaining after the separation of refined resin high in abietic acid from the resinous material obtained by extraction of pinewood with a solvent, heat treating the mixture for about 30 minutes at a temperature of about 400° F., pulverizing the resultant product, adding thereto from 1 to 30% lime, mixing said materials, and heat treating the mixture at a temperature of about 400 to 450° F. for a period of one to one and one-half hours and thereby converting the mixture to a thermosetting material suitable for use as an ingredient of a molding powder, adding the other ingredients of such a molding powder, including wood flour, condensing the mixture by heat and pressure, and cooling the condensed mixture.

9. The method which comprises producing a mixture consisting of 95% pinewood pitch and about 5% hexamethylenetetramine, said pinewood pitch being characterized by being insoluble in petroleum hydrocarbons and comprising a residue low in abietic acid remaining after the separation of refined resin high in abietic acid from the resinous material obtained by extraction of pinewood with a solvent, heating the mixture for approximately 30 minutes at a temperature of about 400° F. pulverizing the resultant product, adding and mixing therewith about 5% lime, and heat treating the mixture at a temperature of about 400 to 450° F.

EUSTACE GLYCOFRIDES.